United States Patent [19]
Gitlin et al.

[11] 4,057,696
[45] Nov. 8, 1977

[54] RECURSIVE-LIKE ADAPTIVE ECHO CANCELLER

[75] Inventors: Richard Dennis Gitlin, Monmouth Beach; John Stewart Thompson, Tinton Falls, both of N.J.

[73] Assignee: Bell Telephone Laboratories, Incorporated, Murray Hill, N.J.

[21] Appl. No.: 712,518

[22] Filed: Aug. 9, 1976

[51] Int. Cl.$^2$ .......................................... H04B 3/20
[52] U.S. Cl. .......................................... 179/170.2
[58] Field of Search ................ 179/170.2, 170.6, 170.8

[56] References Cited

U.S. PATENT DOCUMENTS

| | | | |
|---|---|---|---|
| 3,535,473 | 10/1970 | Flanagan et al. | 179/170.2 |
| 3,597,541 | 8/1971 | Proakis et al. | 179/170.2 |
| 3,732,410 | 5/1973 | Mackechnie | 179/170.2 |
| 3,860,768 | 1/1975 | Wehrmann | 179/170.2 |
| 3,903,377 | 9/1975 | Sato | 179/170.2 |
| 3,922,505 | 11/1975 | Hoge | 179/170.2 |

OTHER PUBLICATIONS

"Convergent Automatic Synthesis Procedures for Sampled-Data Networks with Feedback"; Technical Report No. 6773-1; Stanford Electronics Laboratories, Stanford Univ., Stanford, Calif.; Oct. 1964; pp. 1-62.

*Primary Examiner*—William C. Cooper
*Assistant Examiner*—Randall P. Myers
*Attorney, Agent, or Firm*—John Francis Moran

[57] ABSTRACT

The circuit complexity of a closed-loop echo cancellation system for use in a two-way communication circuit is reduced by employing a second adjustable signal processing network of the transversal type positioned in the control loop to emulate the characteristic of a recursive adjustable signal processing network. The two signal processing networks in the control loop are adjusted simultaneously to effect echo cancellation. The second signal processing network compensates for the effect of transmission poles in the echo return path and reduces the duration of the impulse response of the echo return path significantly so that the first signal processing network in the control loop is greatly simplified. A third signal processing network of the recursive type is adjusted in accordance with the internal settings of the second network to perform signal processing inverse to that of the second network. The recursive network is utilized to provide a clear signal path through the echo cancellation system which is essentially free of echo.

15 Claims, 5 Drawing Figures

RECURSIVE-LIKE ADAPTIVE ECHO CANCELLER

BACKGROUND OF THE INVENTION

This invention relates to the elimination of echoes in communication signal paths and, more particularly, to effective cancellation of echoes by use of an accurate and highly efficient model of the echo path transfer function.

Since echoes in telephone circuits have a disturbing influence on conversation, a number of techniques have been devised to mitigate their effect. Echo suppression was the first technique to be contrived. Typically, echo suppression involves some form of selective attenuation automatically operated in response to voice levels in the transmission paths so that the echo that would otherwise be returned to the talker is suppressed. Such arrangements are generally satisfactory for terrestrial communication paths in which the echo delay or the round-trip propagation time between the source of the signal and the return of the echo is not long.

In communication paths via satellite links, the transmission delays are much longer and the echo is more disturbing and disrupts conversation. Echo suppression techniques basically interrupt the return signal path and have a tendency to mutilate speech by chopping the return signal during intervals wherein both parties are talking; i.e., double talking. This degradation of quality of the communication is subjectively more severe when the signals experience long propagation delays in transmission between the parties. Thus, echo suppressors will probably introduce their own signal degradation in the process of eliminating echoes.

Another more sophisticated approach utilizes echo cancellation wherein a replica of the echo is automatically constructed or adaptively synthesized from the original signal and subtracted from the return signal to eliminate the echo. Most conventional echo cancellers synthesize the replica using a tapped delay line with adjustable multipliers in an adaptive feedforward arrangement also called a transversal filter. The multipliers are automatically adjusted by a control signal derived from the difference between the echo and the replica. Since the impulse response of an echo path may be rather long, accurate synthesis of the replica by transversal filters to effect echo cancellation may require many taps and associated multipliers, an arrangement which is complex and costly. In fact, echo cancellers have not been generally utilized to any great extent because of their high cost.

Feedback or recursive arrangements which have an inherently long impulse response appear to be able to synthesize the replica accurately. Since recursive arrangements are simpler, their use would seem to provide a reduction in complexity and a corresponding lower cost in achieving echo cancellation. However, an inherent difficulty with the recursive arrangement is that its operation cannot be readily adapted by automatic control in order to minimize the mean-squared residual echo. In a practical application, the recursive circuit will not likely converge to the operating point that will provide the most effective echo cancellation because characteristically there are several suboptimum multiplier tap settings to which the adaptation algorithm can converge rather than an optimum unique minimum as is the case for the conventional feedforward echo canceller.

SUMMARY OF THE INVENTION

A primary object of this invention is to provide a recursive-like arrangement for providing a greater degree of echo cancellation than conventional echo cancellers of equivalent circuit complexity.

A related object of the invention is to provide a readily adaptive structure having a unique minimum in its operating characteristic and capable of modeling the transfer function of an echo return path by a rational expression possessing both poles and zeros.

The invention in it various aspects overcomes the limitations of the prior-art echo cancellers. Broadly, the invention includes an adaptive control loop comprising two adaptive transversal filters arranged to have recursive-like modeling capability, but readily adaptable and stable, and a recursive filter completely adapted in accordance with a selected one of the transversal filters. The recursive filter is instrumental in providing a clear signal path essentially free of echo signals. This arrangement provides more efficient echo cancellation by achieving a higher level of echo cancellation than is provided by conventional transversal filter echo cancellers of equivalent overall circuit complexity.

In its broader aspects, the invention takes the form of an adaptive echo canceller connected to sending and receiving signal paths wherein the sending signal path is subjected to an echo signal. The canceller is of the type having a transversal filter for synthesizing, from an input signal on the receiving signal path, a replica to approximate an echo signal for subtraction. In the canceller, an adaptive control loop minimizes the mean, or average, square value of the residual echo resulting from the subtraction and includes a first adaptive signal processing circuit or network for producing a modification of the echo signal on the sending signal path. The canceller has a second adaptive signal processing circuit or network responsive to the first adaptive signal processing circuit, but removed from the control loop and coupled to the sending signal path. The first adaptive signal processing circuit compensates for the effect of transmission poles in the echo signal path and greatly simplifies the complexity of the transversal filter in the control loop. The second adaptive signal processing circuit performs an operation inverse to that of the first circuit and serves to provide a clear sending signal path essentially free of echo.

In some of the more specific aspects of the invention, the second signal processing circuit may be used to complete the synthesis of the replica of the transversal filter or directly in the sending signal path to compensate for the signal processing of the first circuit. The first adaptive signal processing circuit takes the form of a feedforward circuit which serves to alter the transfer function of the path of the echo signal so that the synthesis of the transversal filter in providing a replica of the echo signal models the combined transfer function of the first adaptive signal processing circuit and that of the echo signal path. The first adaptive signal processing circuit includes a delay line having a plurality of tapes and combines a weighting of the signals at the taps to provide the modification of the echo signal. The second adaptive signal processing circuit takes the form of a feedback circuit with a delay line including a plurality of taps and provides a weighting function having the same magnitude but opposite signs to the weighting of the first adaptive signal processing circuit.

BRIEF DESCRIPTION OF THE DRAWING

A more complete understanding of the invention and the various features, additional objects and advantages thereof may be more readily appreciated and better understood by reference to the following detailed description in conjunction with the drawing.

DETAILED DESCRIPTION

Figure 1:
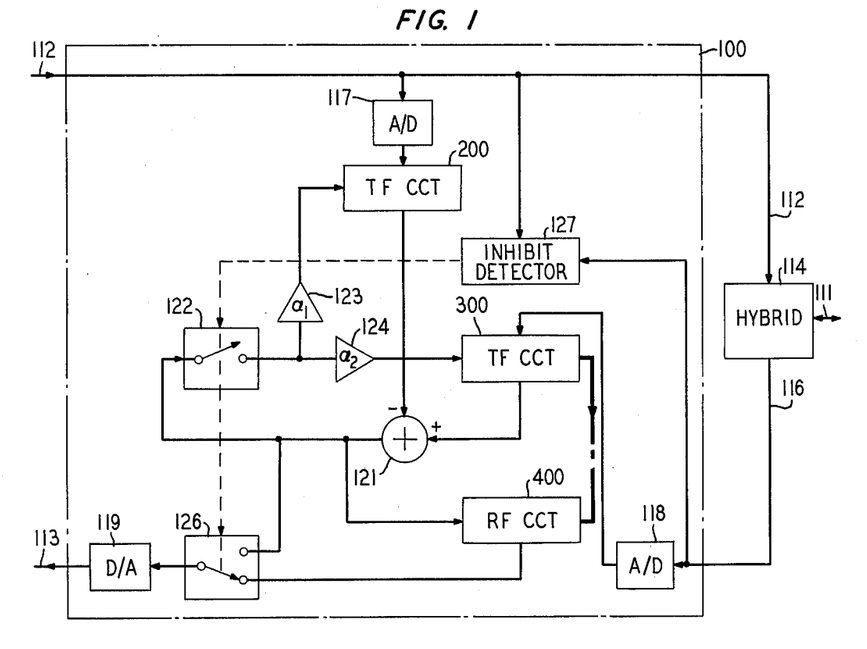
FIG. 1 is a diagram of apparatus arranged in accordance with the invention.

In FIG. 1, if one for the time being ignores the apparatus enclosed by dashed-line box 100, a single transmission terminal is basically illustrated for interconnecting a single two-way circuit 111 with two one-way circuits 112 and 113 by way of hybrid network 114. Hybrid network 114 may generally include a balancing network (not shown) for impedance matching purposes. In telephone parlance, two-way circuit 111 is referred to as a two-wire circuit and one-way circuits 112 and 113 form a so-called four-wire circuit. The former is usually used for local circuits, for example, telephone subscriber loops, while the latter is typically used in toll circuits for distant transmission and may take the form of a carrier transmission system.

Ideally, all signals originating on circuit 112 are only passed on to circuit 111 and incoming signals from the latter are passed on to one-way return circuit 113 by hybrid 114. However, since impedance mismatches cannot be prevented in the actual transmission circuits connected to hybrid 114, a portion of the signal energy in circuit 112 appears on circuit 116 and, in the absence of some form of echo suppression or cancellation, is returned on circuit 113. Due to the transmission delays encountered as the signals propagate over circuits 112, 113 and 116 in FIG. 1, the return signal is perceived as an echo. The complete echo return signal path includes circuit 112, the leakage signal path that traverses hybrid 114, and circuit 116. Accordingly, echo cancelling apparatus 100, which will be discussed hereinafter, is employed to eliminate the return signal without any perceptible interruption in the return signal path between circuits 116 and 113. Circuits 112 and 116 may be, in actuality, carrier systems in which case apparatus 100 will probably be geographically removed from hybrid 114. Furthermore, another echo canceller, most likely identical to apparatus 100, is typically used at the other end of transmission circuits 112 and 113 (not shown in FIG. 1) to provide echo cancellation for signals originating on circuit 113 which are partially returned on circuit 112 as an echo.

The echo cancelling apparatus of FIG. 1 is shown in digital form. Accordingly, analog-to-digital converters 117 and 118 and digital-to-analog converter 119 are utilized to perform the appropriate signal conversions between the analog and digital apparatus of FIG. 1. At this point, it is again stressed that the transmission apparatus in FIG. 1 may take on a number of different forms. For instance, if the signals on circuits 112 and 113 are digital signals, the type of converters shown in FIG. 1 may not be required. In this case, conversions between digital-to-analog and vice versa would become an integral part of circuits 112 and 116 and terminate the two one-way signal paths to provide an analog signal interface for hybrid 114. The echo cancelling apparatus may even be designed to work directly from these digital signals. However, it should be pointed out that the echo cancelling apparatus may also be readily implemented using analog circuitry if desired by those skilled in the art. In this latter situation, no signal conversions would be necessary if the actual transmission signals on circuits 112 and 113 are also analog.

The echo cancelling of FIG. 1 includes transversal filter circuits 200 and 300 which are supplied digital signals by converters 117 and 118. The outputs of circuits 200 and 300 are applied to signal combiner 121 to produce a difference signal which is fed back to circuits 200 and 300 via switch 122 and amplifiers 123 and 124. Since the character of the echo signal is altered by changes in the local two-wire circuit 111, such as connection or disconnection of an extension formed during a conversation, or transfer of calls via key telephones or PBX's, it is necessary to adjust or adapt circuits 200 and 300 in accordance with each change. Of course, any changes directly in circuits 112 and 116 are in the echo return path and will necessitate a responsive adaptation thereto. This adjustment is done upon closure of switch 122. Even in situations involving no change in circuit 111, but rather a change in the character of the signal transmitted over circuit 112, adjustment of circuits 200 and 300 is necessary to provide effective echo cancellation. Since automatic adjustment is performed using the signals actually transmitted, the apparatus automatically and conveniently provides this feature.

The primary return signal path from circuit 116 to circuit 113 includes converter 118, circuit 300, signal combiner 121, recursive circuit 400, switch 126, and finally, converter 119. This signal path is also considered the clear or transparent signal path which will be appreciated from the discussion to follow. Circuits 200, 300 and 400 will be considered in detail later, but for present purposes it is sufficient to state that transversal filter circuits 200 and 300 are in the form of tapped delay line structures including adjustable gain coefficients or weighting at the taps so that they can be adjusted to effect echo cancellation. Circuit 400 also has a tapped delay line with associated adjustable taps but in a feedback or recursive circuit rather than a feedforward transversal circuit.

The arrangement of FIG. 1 is split since circuit 200 shunts hybrid 114 and circuit 300 is serially disposed in the return transmission path of hybrid 114. The split arrangement provides recursive-like echo cancellation because it includes nonrecursive filters able to emulate the characteristic of a recursive filter exhibiting both poles and zeros. The poles and zeros exhibited by the filter are used to cancel out and eliminate the effect of the transmission poles and zeros in the echo path. In the process of adapting circuits 200 and 300, the former synthesizes a partial replica of the echo signal while the latter modifies the echo return signal on circuit 116. Combiner 121 subtracts the two signals from each other and provides a control signal output to which circuits 200 and 300 respond. A minimum absolute value of the control signal indicates optimum automatic adjustment of circuits 200 and 300. In other words, circuit 200 is adapted to model the combined transfer function of the echo return signal traveling through circuit 112, the leakage path traversing hybrid 114, circuit 116 including converter 118, and the signal path through circuit 300. From another perspective, circuits 200 and 300 in this configuration cooperate to form a model of the frequency transfer function of the echo path, which is a rational mathematic expression or fraction wherein the numerator and denominator are polynominals in the frequency variable. In the echo path transmission, transmission zeros are the roots of the numerator polynominal and transmission poles are the roots of the denominator polynominal. As circuit 200 eliminates the effect of the transmission zeros in the echo path upon the output of combiner 121, circuit 300 eliminates the effect of the transmission poles in the same path upon the same output. A time domain interpretation of the modeling process to effect echo cancellation is that circuit 300 time-compresses the overall impulse response of the echo signal path into the span or interval of the delay line internal to circuit 200. Accordingly, circuit 200 is considerably less complex than if it were used without the cooperation of circuit 300.

Although the circuit operation described thus far is capable of providing echo cancellation, it does not provide a clear signal path from circuit 116 to circuit 113. This is primarily due to the operation of circuit 300 which modifies the echo return signal in the process of effecting echo cancellation. Accordingly, the output of combiner 121 is applied to the slaved circuit 400, which is a recursive circuit that has the reciprocal transfer function of circuit 300. Therefore, any linear signal distortion introduced by circuit 300 is compensated by circuit 400 since it provides the inverse signal operation of circuit 300. The output of circuit 400 is normally applied by switch 126 to converter 119. This completes the clear signal path so that signals present on two-way circuit 111 pass through the echo cancellation apparatus of FIG. 1 unimpaired onto circuit 113.

Signals originating from two-way circuit 111 will also affect the operation of the echo cancelling apparatus, but this effect is deleterious. Accordingly, inhibit detector 127 is connected to analog circuits 112 and 116 to detect signals originating from circuit 111 in the presence or absence of signals from circuit 112. If the operation of the echo cancelling apparatus were allowed to proceed in the presence of signals from circuit 111, the signals on circuit 116 produced by original signals on circuit 111 would tend to cause a divergence rather than a convergence to a point for effecting echo cancellation. Inhibit detector 127 thus opens switch 122 so that the control loop is opened and convergence is prevented when signals on circuit 116 are produced by signals emanating from circuit 111. It should be pointed out that switch 126 is also controlled by inhibit detector 127. The main purpose of switch 126 is optional in that slightly better echo cancellation is achieved by returning the output of combiner 121 directly to circuit 113 via converter 119. Of course, it is to be understood that this latter signal path cannot be used during periods of double-talking or when signals are originating on two-way circuit 111. As these times the clear signals path should be utilized to provide an undistorted transmission signal on circuit 113.

Figure 2:
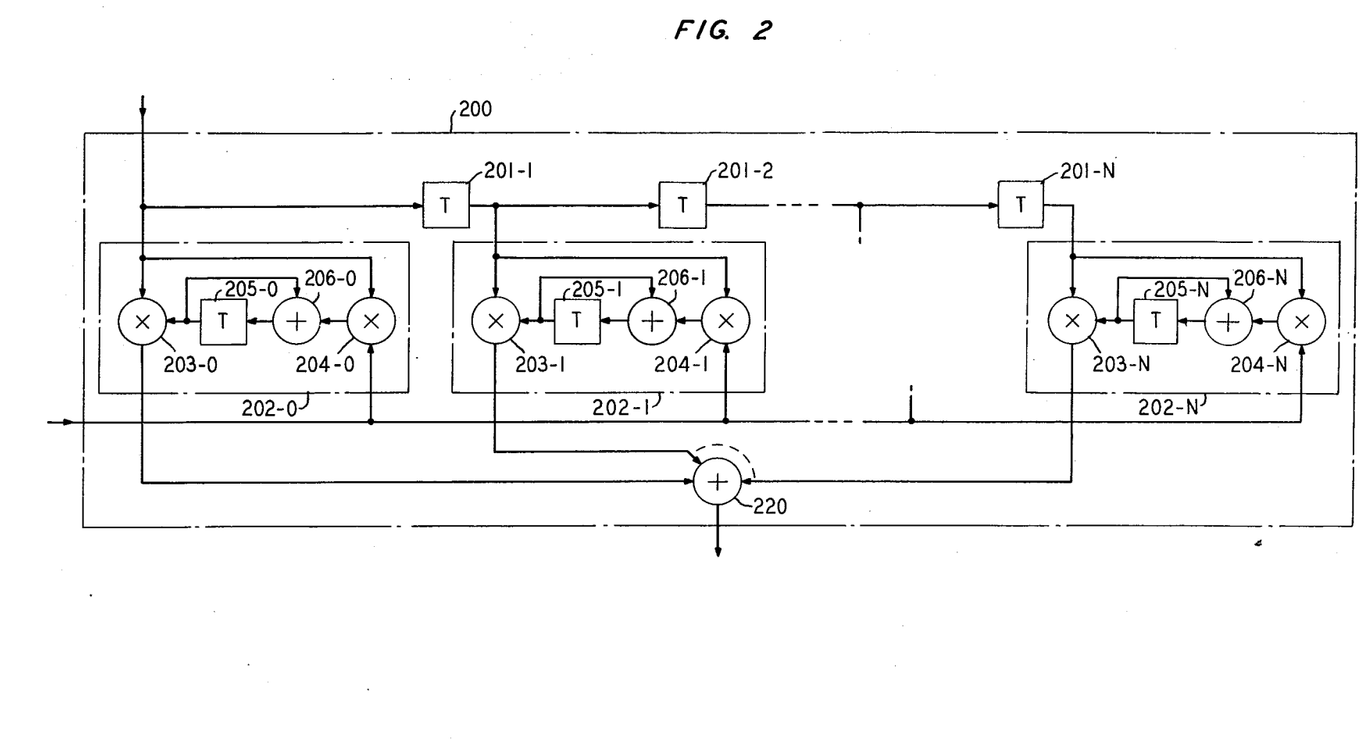
FIG. 2 is a detailed diagram of one of the transversal filters generally shown in the arrangement of FIG. 1.
Figure 3:
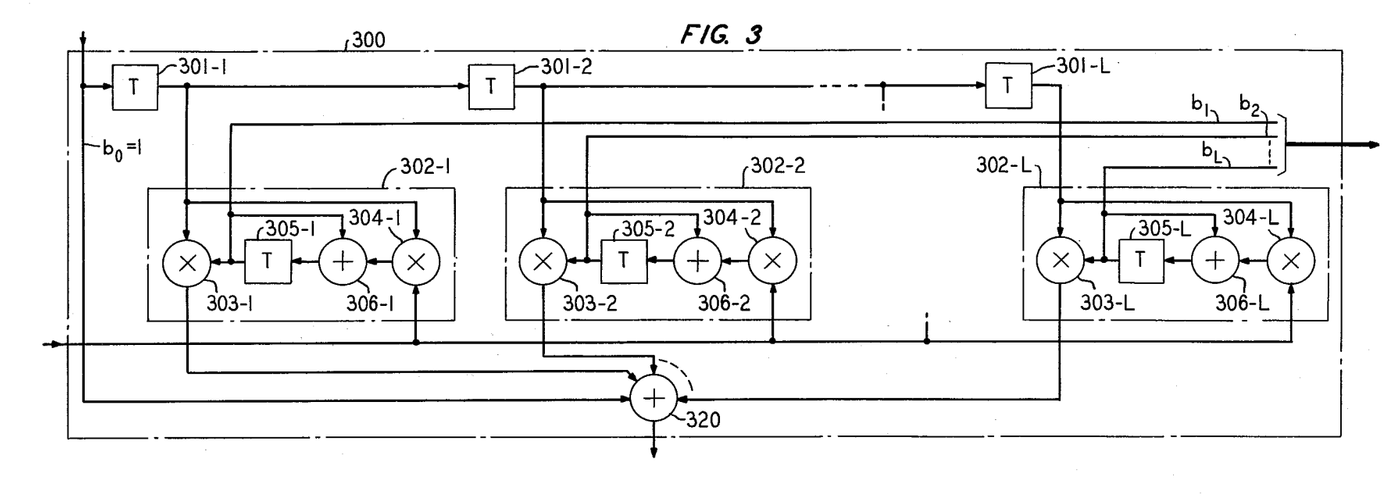
FIG. 3 is a detailed diagram of another of the transversal filters employed in the arrangement of FIG. 1.

FIGS. 2 and 3 are diagrams of adaptive transversal filters serving as adjustable signal processing networks in FIG. 1. Both circuits are shown implemented in digital form with tapped delay lines. These basic circuit configurations and the components therein are generally well known in the art and FIG. 2, per se, does not constitute any part of this invention. In FIG. 2, delay elements 201-1 through 201-N comprise a tapped delay line. Each element of the tapped delay line imparts a delay of T seconds equal to the interval between digital words produced by converter 117 of FIG. 1. When a given digital word is present on the input of each delay unit, the immediately preceding digital word is at its output; thus successive words are available from the outputs of successive delay units or taps of the tapped delay line. Individual digital words produced at the taps of the delay line are adjusted in gain by means of multiplier networks 202-O through 202-N through which they are directed, and are combined in summing network 220. Network 220 produces the output of the circuit.

Each of the multiplier networks 202 comprises digital multipliers 203 and 204 which produce a changeable amount of gain (including gain less than, or greater than, unity which may be either positive or negative) between its two inputs and its output. The gain coefficient of each of multipliers 203 is set in accordance with the encoded polarity and magnitude provided by its respective delay unit 205 and associated adder 206, which form an accumulator. The adaptive control signal of FIG. 1 from amplifier 123 is applied to each of multipliers 204. This arrangement provides incremental changes in the gain coefficients of multipliers 203. While switch 126 is closed, multiplier networks 202-O through 202-N in the adaptive control loop simultaneously converge to a point of maximum effective echo cancellation, i.e., minimum mean-square residual echo, in accordance with the output of combiner 121 of FIG. 1. During intervals when switch 126 is open, the accumulators of elements 205 and 206 store the previous gain coefficient settings enabling circuit 200 to maintain its function.

The circuit of FIG. 3 is primarily the same as the circuit of FIG. 2 so that detailed discussion of each element therein is not warranted. Reference numerals in FIG. 3 of elements identical to that of FIG. 2 are increased by a hundred. FIG. 3 has additional outputs for each of the gain coefficients of multiplier networks 302-1 through 302-L which are applied in FIG. 1 to the recursive filter circuit 400. Another difference is that the coefficient of $b_O$ is forced to unity, thereby eliminating the requirement of multiplier network 302-O (not shown in FIG. 3). This prevents the arrangement of FIG. 1 from converging to an operating point wherein all the gain coefficients of the multipliers in circuits 200 and 300 are zero.

Figure 4:
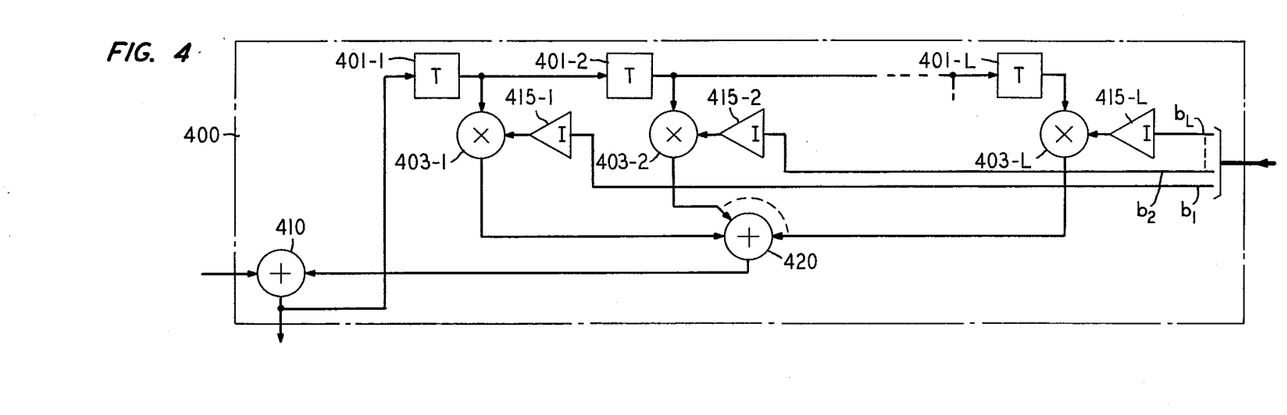
FIG. 4 is a detailed diagram of the recursive filter utilized in the arrangement of FIG. 1.

FIG. 4, the nucleus of the circuit is a duplication of the circuit of FIG. 3 and its peripheral portion is arranged in a feedback or recursive circuit with signal combiner 410. The external input signal to combiner 410 is supplied by combiner 121 of FIG. 1. Signal combiner 420 supplies the internal input or feedback input to combiner 410. The output of combiner 410 is applied to a tap delay line comprised of elements 401-1 through 401-L. Each of delay elements 401 provides an output or a tap in the delay line for a different one of multipliers 403, whose outputs are delivered to combiner 420. The gain coefficient outputs of circuit 300 of FIG. 3, labeled $b_1$, $b_2$ through $b_L$, have their encoded signs inverted by digital sign inverters 415 before application to each one of multipliers 403. In other words, the magnitude of the respective gain coefficients of the multipliers in FIGS. 3 and 4 is the same, but the signs are opposite. If one disregards for the moment the sign change and the recursive connection, the direct slaving interconnection between the circuits of FIGS. 3 and 4 in FIG. 1 allows a single multiplier in the latter to duplicate the same operation as a multiplier network in the former. However, the overall operation of the circuit of FIG. 4 is the inverse of the operation of the circuit of FIG. 3 in providing a modified echo return signal. Since circuits 300 and 400 are serially disposed in the same signal path and perform inverse signal operations on the same signal, they provide a clear signal path essentially free of the linear distortion produced by circuit 300. The previously mentioned selection of the $b_0$ coefficient as unity in circuit 300 is compensated by circuit 400 without utilizing a multiplier on the output of the latter. The clear signal output is provided by combiner 410. An important distinction between circuits 300 and 400 is that while the former is in the control loop, the latter is outside of it. Thus, the aforementioned adaptability problem of utilizing a recursive filter in an adaptive echo cancelling arrangement does not apply since though it is slaved to the operation of the control loop, it is not an integral component thereof which would affect the operation of the control loop.

Figure 5:
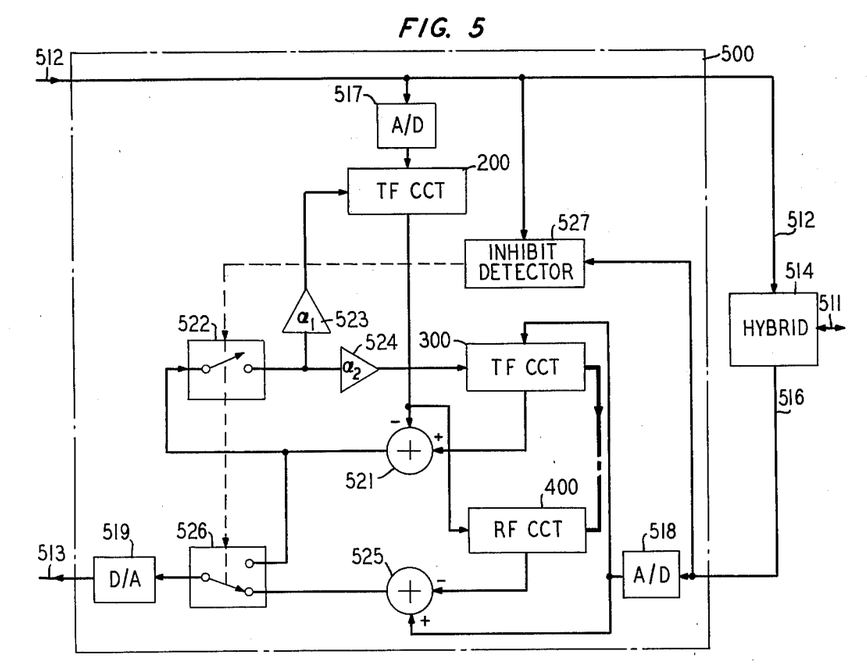
FIG. 5 is a diagram of an alternate arrangement in accordance with the invention.

FIG. 5 is an alternative arrangement to FIG. 1 wherein the echo cancelling apparatus 500 provides a more direct clear signal path than FIG. 1. Reference numerals of elements in FIG. 5 with the same last two digits as those in FIG. 1 are identical in structure and function in both figures. The adjustable signal processing networks 200, 300 and 400 represent those respectively shown in FIGS. 2, 3 and 4. The configuration and operation of the control loop of FIG. 5 which includes elements 200, 300, 521-524 is identical to that of FIG. 1 and further explanation of its operation is not warranted.

The essential difference is that recursive filter circuit 400 which is slaved to transversal filter 300 is used to complete the synthesis of the replica of the echo signal rather than as, in FIG. 1, a means of compensating for circuit 300. Accordingly, the signal input to circuit 400 is the partial replica produced by 200. When the control loop of FIG. 5 converges, circuit 400 modifies the patial replica to provide a complete and highly accurate replica for signal combiner 525. The other input to combiner 525 is the output of converter 518, which is the signal path containing the echo signal. The output of combiner 525 is applied to switch 526. This output, of course, is essentially free of residual echo when the control loop of FIG. 5 converges. Switch 526 selects the input for converter 519. The optional nature of switch 126 in FIG. 1 also pertains to switch 526. Converter 519 provides the analog return signal for circuit 513.

The advantage of this arrangement is that the replica is synthesized by the combined processing of circuits 200 and 400 to provide a recursive structure able to compensate for both transmission poles and zeros in the echo return path. As in FIG. 1, the operation of circuit 400 is slaved to circuit 300 although it is removed from the control loop of FIG. 5 to accrue the same advantages as that of FIG. 1. The synthesized replica is then directly combined with the echo return signal to effect echo cancellation. Since circuit 400 performs a signal processing function rather than a compensating function as in FIG. 1, the circuit of FIG. 5 is less susceptible to the relative inaccuracies between circuits 300 and 400 and attendant tracking error which may result in less than total compensation in providing the clear signal path of FIG. 1.

In the foregoing discussion, design details have purposely not been specified because the adaptive algorithm controlling the operation of the control loops of FIGS. 1 and 5 is not peculiar in any respect, and is subject to the same design considerations as similar adaptive minimum mean-square control loops which are well known in the art. This operational characteristic is, indeed, an advantageous feature since either of the arrangements in FIGS. 1 and 5 is able to provide recursive-like echo cancellation and attendant hardware simplification. In various simulations which duplicate a variety of transmission environments, eight taps and associated multiplier networks for adjustable weightings in circuit 300, which are partially duplicated in circuit 400, and 32 adjustable tap weights in circuit 200 provided superior echo cancellation for each simulation over conventional transversal filter echo cancellers of equivalent overall circuit complexity.

For a general discussion of the effect of the gain factor in the control loop (i.e., $\alpha_1$ and $\alpha_2$ of respective amplifiers 123 and 124 in FIG. 1 and equivalent of FIG. 5) on rate of convergence of the loop, see an article entitled "An Adaptive Echo Canceller" by M. M. Sondhi, in the *Bell System Technical Journal*, Vol. 46, No. 3, March 1967, pp. 497–511. Intermediate values are typically chosen for $\alpha_1$ and $\alpha_2$ since small values slow down the convergence to effect echo cancellation while large values converge fast but limit the accuracy of the convergence. Although FIGS. 1 and 5 imply that the value of $\alpha_1$ is different from $\alpha_2$, the values are not critical and they may be the same. This would, of course, eliminate the use of one of loop gain amplifiers 123 and 124 in FIG. 1. A more detailed description of control loops, and particularly the estimated-gradient algorithm inherent to the operation of multiplier networks 202 and 302 of FIGS. 2 and 3 as utilized in the control loops of FIGS. 1 and 5 is presented in "On the Design of Gradient Algorithms for Digitally Implemented Adaptive Filters" by R. D. Gitlin, J. E. Mazo and M. G. Taylor, in the *IEEE Trans. on Circuit Theory*, Vol. CT-20, No. 2, March 1973, at pp. 125–136. Notwithstanding that the specific apparatus of the foregoing paper is adaptive digital equalizers, the type of circuitry employed and various considerations are readily applicable to the control loops of adaptive digital echo cancellers.

Although the apparatus for effecting echo cancellation has been illustrated by means of digital apparatus, it will be evident to those skilled in the art that equivalent analog circuit techniques may also be employed to advantage. Even in digital apparatus, the arithmetic functions in the signal processing networks may be time-shared to provide a further reduction in implementing apparatus, thereby exploiting the high speed capability of digital apparatus such as, for example, digital multipliers. In other words, time-division multiplexing will achieve further circuit economies, particularly in view of the relatively slow word rate required for encoded speech. One or more of these illustrated echo cancellers may also be time-division multiplexed to serve a plurality of transmission channels providing system economies. Furthermore, it is to be understood that the arrangements described in the foregoing are merely an illustrative application of the principles of the present invention. Numerous and varied other arrangements may be utilized by those skilled in the art without departing from the spirit and scope of the invention.

What is claimed is:

1. An echo canceller of the type having a transversal filter means for synthesizing from an input signal on a receiving signal path a replica signal to approximate an echo signal on a sending signal path for subtraction from the echo signal, means for subtracting the replica signal from the echo signal to produce a residual echo signal, said transversal filter means responsive to the residual echo signal for changing the replica signal to reduce the residual echo signal, said canceller further comprising first adaptive signal processing means responsive to the residual echo signal for modifying the echo signal on said sensing signal path before the subtraction, and second adaptive signal processing means coupled to receive the residual echo signal and responsive to said first adaptive processing means for providing an operation inverse to that of said first processing means to produce a clear sending signal essentially free of the echo signal.

2. An echo canceller in accordance with claim 1 wherein said first adaptive signal processing means is a feedforward circuit serving to alter the transfer function of the path of the echo signal so that the synthesis of said transversal filter means in producing the replica signal models the combined transfer function of said second adaptive signal processing means and the transfer function of the echo signal path.

3. An echo canceller in accordance with claim 2 wherein said first adaptive signal processing means includes a delay line having a plurality of taps and means for combining weighted signals at said taps to provide the modification of the echo signal.

4. An echo canceller in accordance with claim 3 wherein said first adaptive means further includes means coupled to the signal input of said delay line and said means for combining for providing a signal path of unity gain.

5. An echo canceller in accordance with claim 4 wherein said second adaptive signal processing means includes a feedback circuit having a delay line including a plurality of taps coupled to said means for combining for providing a weighting function having the same magnitudes but opposite signs to the weighting performed by said first adaptive signal processing means.

6. An echo canceller in accordance with claim 5 further comprising means for detecting signal levels in both said sending and receiving signal paths for indicating the presence of an original signal from said sending signal path while a signal is absent or present on said receiving signal path and switching means in said sending signal path for utilizing said clear signal in response to the indication and utilizing the residual echo signal in the absence of the indication.

7. Echo cancellation apparatus comprising: an adjustable signal processing network connected to form a signal path shunting the leakage signal path of an echo return signal on one side of a junction connecting transmission circuits, said network synthesizing from the transmission signal that produces the echo return signal a replica signal to approximate same, signal combining means connected to receive the replica signal and another signal for providing a residual echo signal for adjusting said network, a second adjustable signal processing network responsive to the residual echo signal and connected to receive the return echo signal to provide a selective signal modification as the other signal of said signal combining means, and said networks being adjusted together to adapt to a model of the transfer function of said leakage path characterized by a rational mathematical expression possessing poles and zeros as respective roots of the denominator and numerator of the rational expression whereby the effect of transmission zeros inherent to said leakage path is substantially eliminated by said first mentioned network and the effect of transmission poles inherent to said leakage path is substantially eliminated by said second network when the residual echo signal is at a minimum magnitude.

8. In a closed loop, an adaptive echo cancellation system for use in a two-way communication system, the combination which comprises:
a first adjustable signal processing network connected to receive signals from the first of two one-way transmission paths connected by a junction to a two-way transmission path, said first network developing a selectively altered signal, and said junction being traversed by a leakage signal path having a transfer function substantially approximated by a rational mathematical expression possessing poles and zeros,
a second adjustable signal processing network serially connected to the second path of said two one-way transmission paths to provide a selectively modified output signal derived from the signal in said second path,
combining means connected to receive the modified signal and the altered signal to provide a control signal for said processing networks to eliminate substantially the effect of the signal of said leakage path in said second path wherein said second network substantially eliminates the effect of the poles of the rational expression while said first network eliminates the effect of the zeros of same, and
a third adjustable signal processing network connected to receive the said control signal and slaved to said second adjustable signal processing network for providing an operation inverse to that of said second network and producing a clear output signal essentially free of the echo signal.

9. In an echo canceller of the type having a transversal filter means for synthesizing from an input signal on a receiving signal path a replica signal to approximate an echo signal on a sending signal path for subtraction from the echo signal, means for subtracting the replica signal from the echo signal to produce a residual echo signal, said transversal filter means responsive to the residual echo signal for changing the replica signal to reduce the residual echo signal, said canceller further comprising first adaptive signal processing means responsive to the residual echo signal for modifying the echo signal on said sending signal path before the subtraction, and second adaptive signal processing means coupled to receive the replica signal and responsive to said first adaptive processing means, said second adaptive processing means selectively altering the replica signal to make an altered replica signal suitable for subtraction directly from the echo signal, and subtracting means for combining the altered replica signal and the echo signal on said sending path to provide a clear sending signal essentially free of the echo signal.

10. An echo canceller in accordance with claim 9 wherein said first adaptive signal processing means is a feedforward circuit serving to alter the transfer function of the path of the echo signal so that the synthesis of said transversal filter means in providing the replica signal models the combined transfer function of said first adaptive signal processing means and the transfer function of the echo signal path.

11. An echo canceller in accordance with claim 10 wherein said first adaptive signal processing means includes a delay line having a plurality of taps and means for combining weighted signals at said taps to provide the modification of the echo signal.

12. An echo canceller in accordance with claim 11 wherein said first adaptive means further includes means coupled to the signal input of said delay line and said means for combining for providing a signal path of unity gain.

13. An echo canceller in accordance with claim 12 wherein said second adaptive signal processing means includes a feedback circuit having a delay line including a plurality of taps coupled to said means for combining for providing a weighting function having the same magnitudes but opposite signs to the weighting performed by said first adaptive signal processing means.

14. An echo canceller in accordance with claim 13 further comprising means for detecting signal levels in both said sending and receiving signal paths for indicating the presence of an original signal from said sending signal path while a signal is absent or present on said receiving signal path and switching means in said sending signal path for utilizing said clear signal produced by said signal combining means in response to the indication and utilizing the residual echo signal in the absence of the indication.

15. In a closed loop, an adaptive echo cancellation system for use in a two-way communication system, the combination which comprises:

a first adjustable signal processing network connected to receive signals from the first of two one-way transmission paths connected by a junction to a two-way transmission path, said first network developing a selectively altered signal, and said junction being traversed by a leakage signal path having a transfer function substantially approximated by a rational mathematical expression possessing poles and zeros, a second adjustable signal processing network serially connected to the second path of said two one-way transmission paths to provide a selectively modified output signal derived from the signal in said second path, combining means connected to receive the modified signal and the altered signal to provide a control signal for said processing networks to eliminate substantially the effect of the signal of said leakage path in said second path wherein said second network substantially eliminates the effect of the poles of the rational expression while said first network eliminates the effect of the zeros of same, a third adjustable signal processing network connected to receive the selectively altered signal of said first adjustable signal processing network and slaved to said second adjustable signal processing network for providing an operation inverse to that of said second network on the altered signal to produce a replica signal suitable for subtraction directly from the echo signal and means for subtracting the replica signal from the echo signal of said second path to provide a clear output signal essentially free of the echo signal.

* * * * *

UNITED STATES PATENT AND TRADEMARK OFFICE
CERTIFICATE OF CORRECTION

PATENT NO. : 4,057,696

DATED : November 8, 1977

INVENTOR(S) : Richard D. Gitlin and John S. Thompson

It is certified that error appears in the above-identified patent and that said Letters Patent are hereby corrected as shown below:

Column 2, line 12, "it" should read --its--. Column 2, line 62 "tapes" should read --taps--. Column 4, line 13, after "cancelling" add --apparatus--. Column 7, line 43, "patial" should read --partial--. Column 8, line 44, "apparatus" should read --application--. Column 9, line 13, "sensing" should read --sending--.

Signed and Sealed this

Ninth Day of May 1978

[SEAL]

Attest:

RUTH C. MASON
Attesting Officer

LUTRELLE F. PARKER
Acting Commissioner of Patents and Trademarks